United States Patent [19]

Harder, Jr.

[11] 4,098,357

[45] Jul. 4, 1978

[54] VERTICALLY ADJUSTABLE, PRE-LOADABLE TORSION BAR SUSPENSION

[75] Inventor: Arthur J. Harder, Jr., Franklin Park, Ill.

[73] Assignee: Coach and Car Equipment Corporation, Elk Grove Village, Ill.

[21] Appl. No.: 740,477

[22] Filed: Nov. 10, 1976

[51] Int. Cl.² ............................................. A45D 19/04
[52] U.S. Cl. ..................................... 248/399; 248/373
[58] Field of Search ........................ 248/373, 378, 399; 297/304, 307, 308

[56] References Cited

U.S. PATENT DOCUMENTS 3,774,963  11/1973  Lowe ................................. 248/399 X 3,954,298  5/1976  Lowe ................................. 248/399 X

FOREIGN PATENT DOCUMENTS

| | | |
|---|---|---|
| 2,002,125 | 7/1970 | Fed. Rep. of Germany ....... 248/373 |
| 1,780,653 | 5/1973 | Fed. Rep. of Germany ....... 248/399 |
| 1,273,273 | 5/1972 | United Kingdom ................ 248/373 |

*Primary Examiner*—Lawrence J. Staab
*Attorney, Agent, or Firm*—Merriam, Marshall & Bicknell

[57] ABSTRACT

A torsion bar suspension system for a seat. Structure is provided for twisting the torsion bar to preload it. Structure is also provided for adjusting the height of the seat without changing the preload in the torsion bar, and this is accomplished by pivoting the preloading structure, with the torsion bar, about the axis of the torsion bar.

7 Claims, 10 Drawing Figures

VERTICALLY ADJUSTABLE, PRE-LOADABLE TORSION BAR SUSPENSION

BACKGROUND OF THE INVENTION

The present invention relates generally to suspension systems for vehicle seats, and more particularly to torsion bar suspension systems for seats used in trucks or off-the-road vehicles.

When a truck or off-the-road vehicle rides along a highway or moves across bumpy terrain, the driver or other seat occupants are bounced up and down in their seats. In a seat suspension system employing a torsion bar, the downward movement of the loaded or occupied seat acts against a resilient torsion bar which undergoes twisting in response to that downward movement. The torsion bar's natural resistance to being twisted provides the cushioning or spring action. The extent to which a torsion bar twists or gives depends upon the weight of the seat's occupant. Depending upon the weight or preferences of the seat's occupant, the torsion bar may give too much or too little. Therefore, it is desirable that a torsion bar suspension system be adjustable so that the torsion bar twists or gives in accordance with the particular weight or preference of the particular occupant of the seat at any given time. Adjustment of the torsion bar suspension system for this purpose is usually accomplished by preloading or pre-twisting the torsion bar in a direction opposite to that in which it undergoes twisting in response to downward movement by an occupied seat.

It is also desirable that a torsion bar suspension system include seat-height adjusting structure to position the seat occupant at whatever height he prefers at any given time. However, such a height adjustment should be accomplished without changing the preload on the torsion bar, otherwise an occupant of the vehicle seat will have to adjust the preload every time he adjusts the height of the seat.

A prior art attempt to accomplish height adjustment without changing the preload in the torsion bar is disclosed in Lowe U.S. Pat. No. 3,774,963, but this prior art attempt employs a complicated structure involving a large number of parts.

SUMMARY OF THE INVENTION

The present invention provides a torsion bar suspension system for a seat. The system includes structure for preloading the torsion bar and for vertically adjusting the seat without changing the preload on the torsion bar. In addition, both the preloading structure and the vertical adjusting structure are relatively simple and embody a minimum number of parts.

In essence, the torsion bar suspension system comprises a base member with a horizontally disposed second member or tube pivotally mounted on the base member. An elongated link member has one end attached to the tube for pivotal movement therewith and extends forwardly from the tube. A seat is supported at the forward end of the link member. Extending coaxially within the tube is an elongated torsion bar having one end fixed to the tube. The other end of the torsion bar is fixed to an arm extending radially outwardly from the torsion bar.

The torsion bar is preloaded by structure which exerts a force against the outer end of the radial arm, thereby tending to rotate the arm with the torsion bar about the axis of the torsion bar.

Height adjustment is provided by structure which pivots the preloading structure, together with the tube and the torsion bar, about the mutual axis of the tube and torsion bar, thereby raising or lowering the forwardly extending link member and the seat supported thereon. Because the preloading structure is pivoted together with the tube and the torsion bar, with all of these parts pivoting about the same axis, there is no change in the preload on the torsion bar during height adjustment.

Other features and advantages are inherent in the structure claimed and disclosed or will become apparent to those skilled in the art from the following detailed description in conjunction with the accompanying diagrammatic drawing.

DETAILED DESCRIPTION

Figure 1:
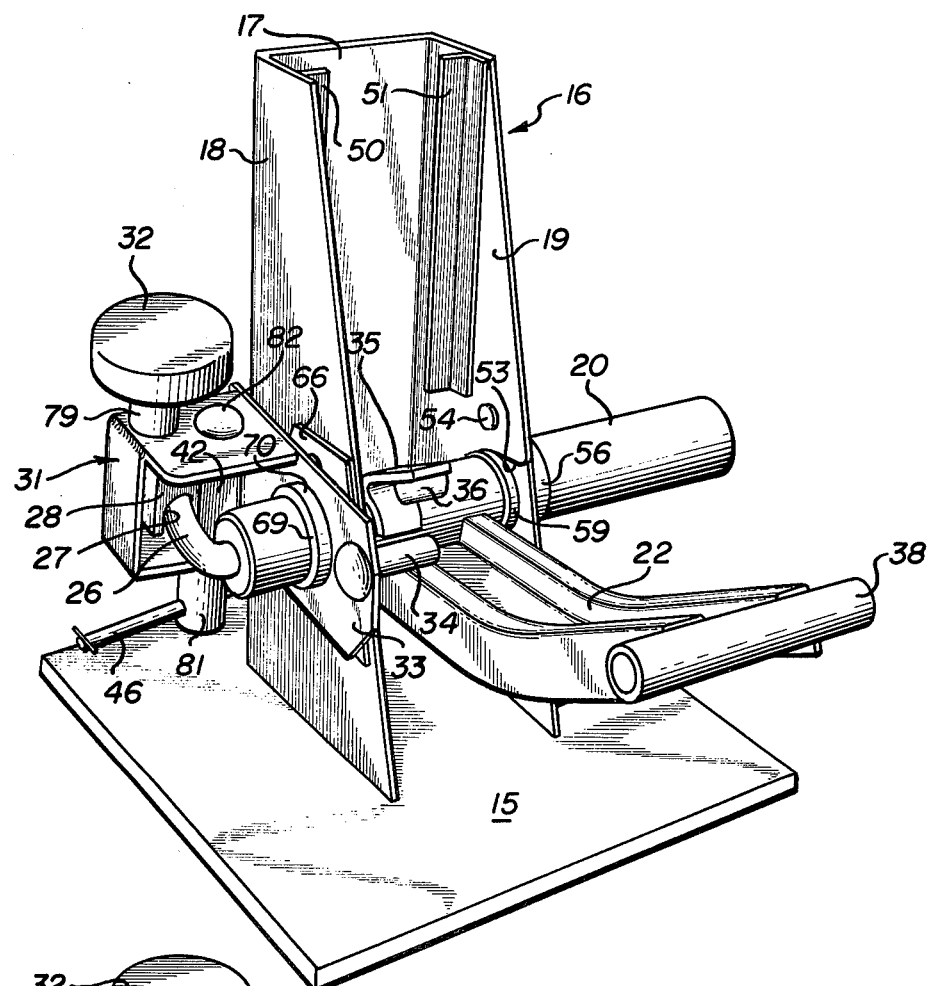
FIG. 1 is a perspective of a seat suspension system constructed in accordance with an embodiment of the present invention.
Figure 3:
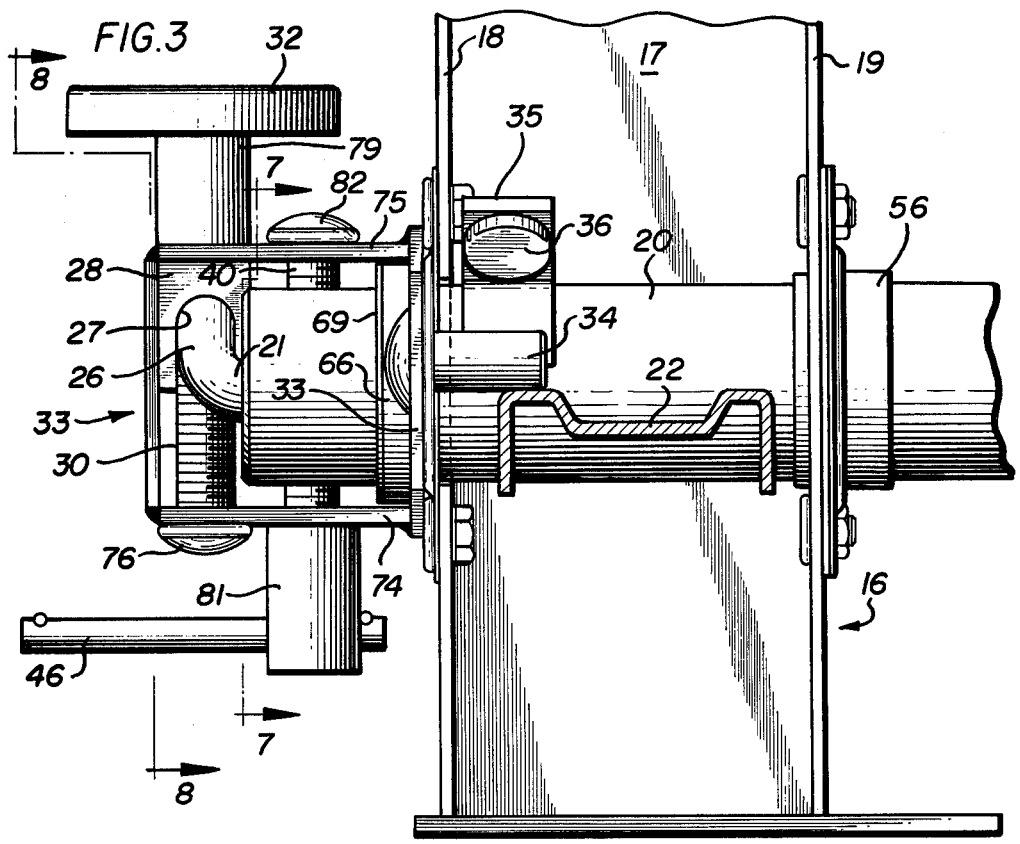
FIG. 3 is a fragmentary front view of the suspension system, partially in section.
Figure 5:
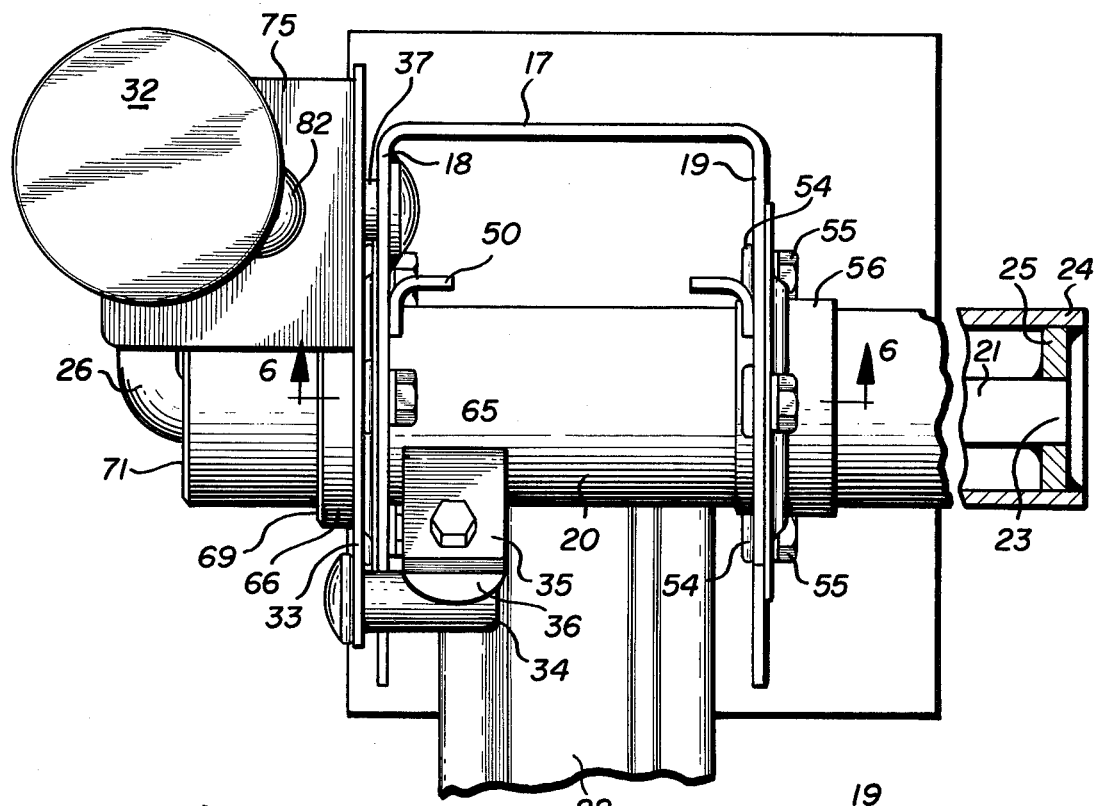
FIG. 5 is a fragmentary plan view of the suspension system, partially in section.

Referring initially to FIGS. 1, 3 and 5 there is disclosed a torsion bar suspension system constructed in accordance with an embodiment of the present invention. The suspension system is shown resting atop a plate 15. Extending upwardly from plate 15 is a vertically disposed base or first member 16 comprising a back 17 and a pair of sides 18, 19. Pivotally mounted on sides 18, 19 is a horizontally disposed tube or second member 20. Attached to tube 20, as by welding, is one end of an elongated link member 22 extending forwardly from tube 20 in a direction transverse to the axis of the tube. A seat (not shown) is attached to the forward end 38 of link member 22.

Extending coaxially within tube 20 is an elongated torsion bar 21 shown as having a round cross-section, although other torsion bar cross-sections, such as square or rectangular, may be used. Referring to FIG. 5, torsion bar 21 has an end 23 (to the right in FIG. 5) fixed to a corresponding end 24 of tube 20. This may be accomplished by welding torsion bar end 23 to an inner portion of an annular element 25 having its outer portion welded to tube end 24. The other end of torsion bar 21, opposite end 23, is bent at right angles to form a radially extending arm 26.

The torsion bar may be preloaded by exerting a force against the outer end of arm 26, thereby tending to rotate the arm, together with the adjacent portions of torsion bar 21, about the axis of the torsion bar. Because torsion bar end 23, opposite arm 26, is fixed to tube 20, fixed end 23 resists rotation when the opposite end of the torsion bar is rotated with arm 26. As a result, rotation of arm 26 and the adjacent portions of torsion bar 21 twists the torsion bar, thereby preloading it.

Structure for exerting a force against the outer end of arm 26, thereby to preload the torsion bar, will now be described.

Figure 4:
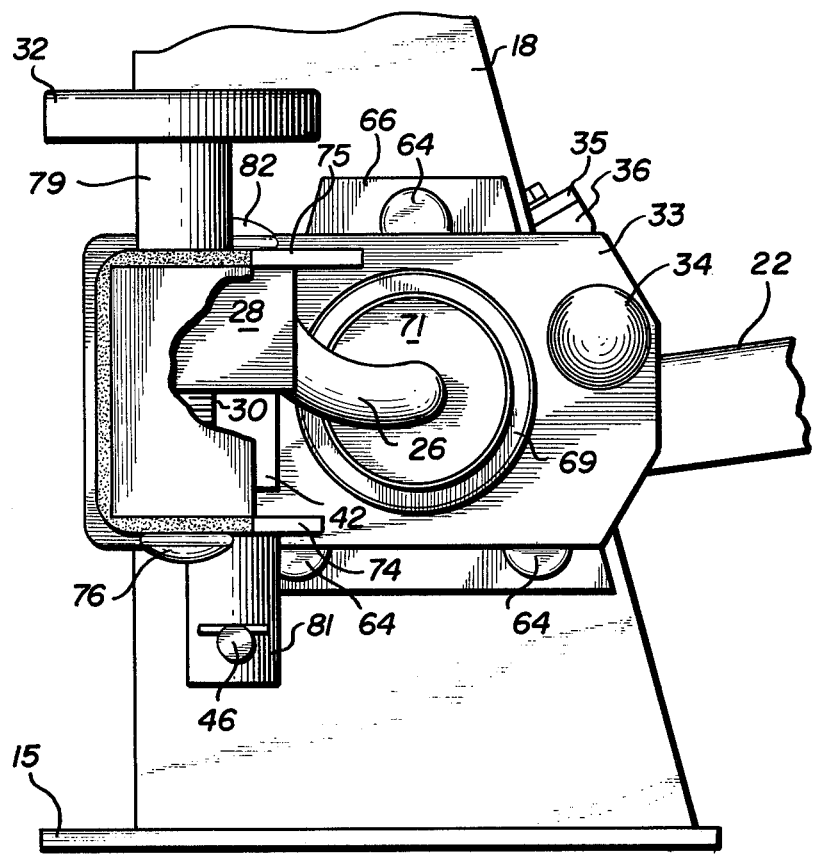
FIG. 4 is a fragmentary elevational view of the suspension system, partially cut away.
Figure 8:
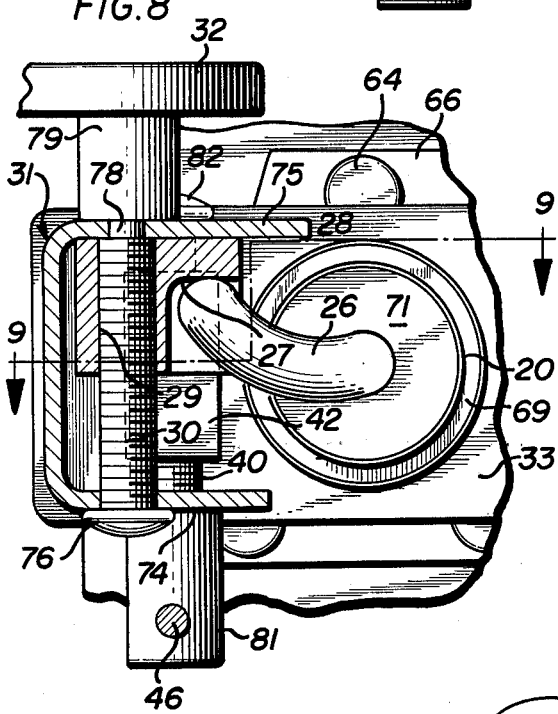
FIG. 8 is a sectional view taken along line 8—8 in FIG. 3.
Figure 9:
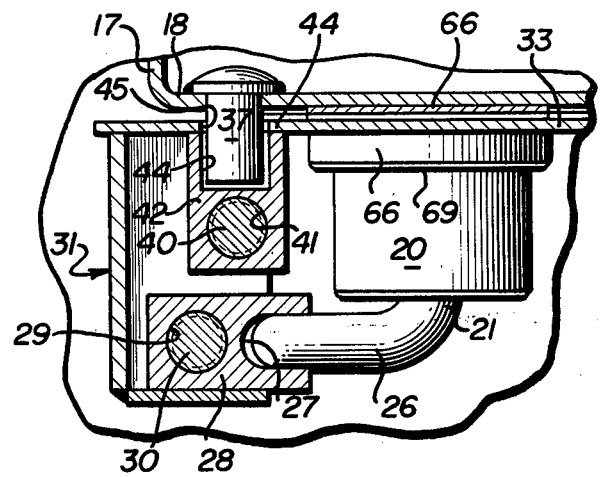
FIG. 9 is a sectional view taken along line 9—9 in FIG. 8.
Figure 10:
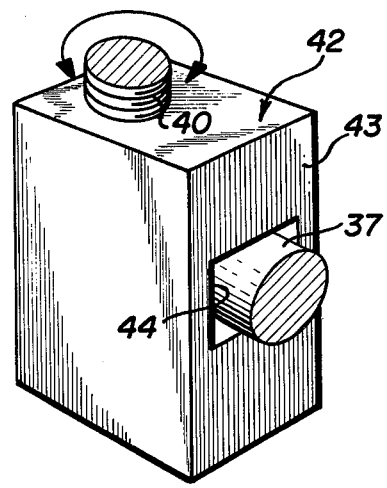
FIG. 10 is a perspective view of a portion of the height adjusting structure for the suspension system.

Referring to FIGS. 1–4 and 8–9, the outer end of arm 26 is engaged within a groove 27 on a clevis element 28 internally threaded at 29 for mounting on a screw 30 rotatably mounted on a chassis 31 and fixed against longitudinal movement relative to chassis 31. Attached to one end of screw 30 is a handle 32 for rotating the former. Turning handle 32 causes screw 30 to rotate, in turn causing clevis element 28 to move axially along screw 30. Axial movement of clevis element 30 in a downward direction exerts against arm 26 a force tending to rotate the arm about the axis of torsion bar 21, in a counterclockwise sense (FIGS. 4 and 8), thereby to twist the torsion bar. Rotation of screw 30 in a direction which causes clevis 28 to move axially in an upward direction along screw 28 relieves the force exerted against arm 26, and the natural tendency of the resilient, preloaded torsion bar to return to an untwisted condition causes the arm 26 to rotate in a clockwise sense (FIGS. 4 and 8).

Chassis 31 includes an extension 33 which mounts chassis 31 on side 18 of vertically disposed base member 16. Chassis 31 is mounted in such a manner, by structure to be subsequently described, that the chassis is pivotable about the axis of tube 20 and torsion bar 21.

Located at the free or outer end of extension 33 is a pin 34 extending inwardly relative to base member 16 (FIGS. 1–5). The lower surface portion of pin 34 is engaged by an upper surface portion of link member 22 to prevent rotation in a counterclockwise sense, as viewed in FIG. 4, of link member 22 and tube 20 during exertion of a force against arm 26 for the purpose of preloading torsion bar 21. If tube 20 could so rotate while arm 26 was being similarly rotated, torsion bar 21 would not undergo twisting or preloading.

When a load is applied to the seat attached to link member front end 38, the link member may be urged downwardly, and this causes tube 20 to rotate about its axis, in a clockwise sense as viewed in FIG. 4. Such downward movement of link member 22 is limited by structure (FIGS. 1 and 3–6) comprising a bracket 35 on the outside of tube 20 from which depends a bumper 36 for engaging an upper portion of pin 34 upon such clockwise rotation of tube 20. The preload in the torsion bar normally urges tube 20 (and attached link member 22) to rotate in a counterclockwise sense thereby urging link member 22 to return upwardly. As previously noted, stop pin 34 limits upward movement of link member 22. The normal vertical position of any part of link member 22 (and of the seat attached thereto) is determined by the vertical position it attains when link member 22 engages stop pin 34. No part of link member 22 can be raised further unless stop pin 34 is raised.

As shown in the drawings, stop pin 34 is unconnected to link member 22 and is not part of any shock absorbing structure in the seat suspension. Stop pin 34 extends across the pivotal path of link member 22 to limit upward pivotal movement of the link member.

Because stop pin 34 is attached to chassis extension 33, the stop pin can be raised by pivoting chassis 31 in a counterclockwise sense (FIG. 4) about its axis of rotation (also the axis of tube 20 and torsion bar 21).

Because the torsion bar preload structure is carried by chassis 31, when chassis 31 is pivoted, the preload structure similarly pivots, so that all the elements in the preload structure, as well as arm 26, torsion bar 21, tube 20 and link member 22, maintain the same relationship as prior to the pivoting of chassis 31. In this manner, the vertical adjustment of the seat carried by link member 22 can be accomplished without changing the preload in the torsion bar.

Chassis 31 is normally prevented from rotating about its axis by a stud 37 extending outwardly from side 18 of base member 16. This prevents the chassis from pivoting in response to engagement of stop pin 34 by upwardly moving link member 22. Thus, chassis 31 is normally prevented from rotating or pivoting by stud 37, stop pin 34 won't be raised unless chassis 31 pivots, and upward movement of link member 22 is limited by stop pin 34. Therefore, pre-loading of the torsion bar can be accomplished without raising link member 22 beyond the angularly elevated position it attains when it engages stop pin 34. This position is usually well below the link member's maximum elevated position attainable by raising stop pin 34 in turn attainable by pivoting chassis 31, which pivoting, as previously noted, is normally prevented by stud 37. The axis of stud 37 is parallel to but displaced from the axis of tube 20 and torsion bar 21, about which chassis 31 pivots. Stud 37 engages structure, to be subsequently described, carried within chassis 31. Such structure, which includes height adjusting means actuable to pivot chassis 31, will now be described, with reference to FIGS. 2 and 7–10.

Mounted for rotation on chassis 31 is a vertically disposed, externally threaded member 40. Member 40 is fixed against axial movement relative to chassis 31. Member 40 extends through a threaded opening 41 in an internally threaded element 42 located inside chassis 31. Element 42 includes a side 43 facing stud 37 on side 18 of the base member. Located within element 42 at side 43 is a recess 44 for receiving the outer end portion of stud 37, the latter extending from base member side 18 through an opening 45 in chassis extension 33 into recess 44.

Recess 44 has a rectangular cross-section transverse to the axis of stud 37. One dimension of the rectangular cross-section (the vertical dimension as viewed in FIG. 7) corresponds essentially to the diameter of stud 37 to provide for pivotal movement of internally threaded element 42 about the axis of stud 37. The other dimension of the rectangular cross-section (the horizontal dimension as viewed in FIG. 7) is substantially greater than the diameter of stud 37 to provide for lateral movement of internally threaded element 42 relative to the axis of stud 37.

Stud 37 normally engaged by the upper and lower surfaces of recess 44 (FIGS. 7 and 10) to prevent rotation of chassis 31 about the axis of tube 20 and torsion bar 21. However, such rotation of chassis 31 can be accomplished by rotating externally threaded member 40 about its axis, in a manner now to be described.

Located below chassis 31 is a handle 46 which may be turned to rotate externally threaded member 40 relative to chassis 31. Internally threaded element 42 is prevented from moving axially along externally threaded member 40 when the latter rotates because of the engagement of internally threaded element 42 with stud 37. Therefore, externally threaded member 40 must move axially relative to internally threaded element 42 when member 40 is rotated. Because externally threaded member 40 is fixed against axial movement relative to chassis 31, any axial movement of externally threaded member 40 relative to internally threaded element 42 is accompanied by similar movement on the part of chassis 31. Such movement takes the form of pivotal movement by member 40 and chassis 31 about the latter's pivotal axis (which is also the axis of tube 20 and torsion bar 21). This particular pivotal movement is the only movement, having a component in the direction of the axis of member 40, of which chassis 31 is capable.

Internally threaded element 42 is prevented, by its engagement with stud 37, from pivoting about the axis of tube 20. However, as externally threaded member 40 pivots about that axis, internally threaded element 42 pivots about the axis of stud 37 and slides laterally, relative to stud 37, in a direction transverse to the axis of stud 37 to accommodate to the pivoting of member 40 about the axis of tube 20. Both the pivotal movement and the lateral movement of element 42 on stud 37 occur within recess 44 of element 42.

There is sufficient clearance between stud 37 and opening 45 in chassis extension 33 to accommodate pivotal movement of chassis extension 33 about the axis of tube 20. That is, there is no engagement by an edge of opening 45 with stud 37 during said pivotal movement.

Following is a more specific description of the structure of the suspension system described above.

Referring to FIGS. 1 and 5, attached to sides 18, 19 of base member 16 are L-shaped strips 50, 51 which cooperate with back 17 of the base member to define tracks for rollers (not shown) attached to the seat back (not shown) of the seat mounted on the suspension system.

Figure 2:
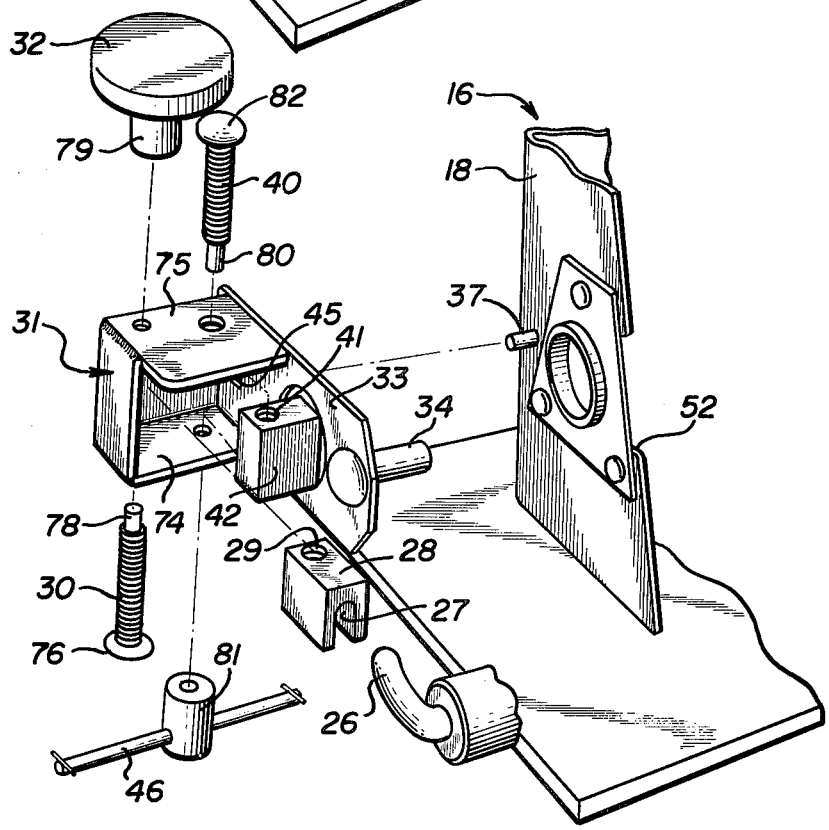
FIG. 2 is a fragmentary, exploded perspective view illustrating the preloading structure and height adjusting structure of the suspension system.
Figure 6:
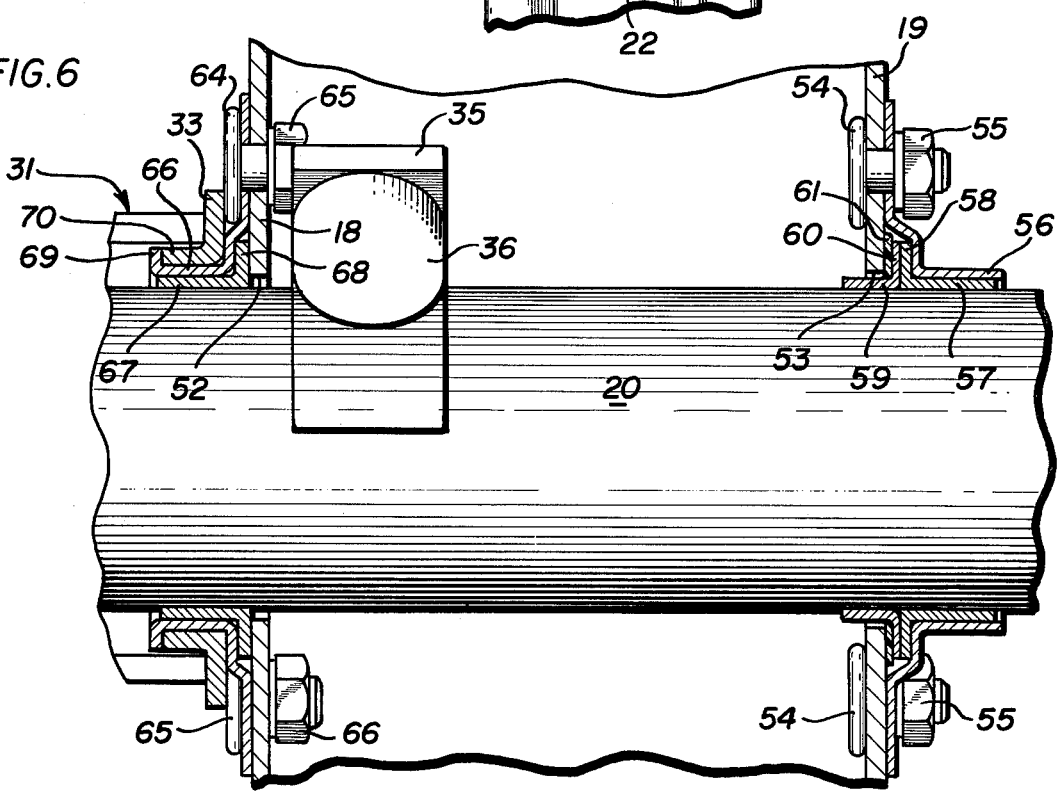
FIG. 6 is an enlarged, fragmentary sectional view taken along line 6—6 in FIG. 5.

FIGS. 3, 5 and 6, illustrate the details of structure for rotatably mounting tube 20 on base member 16. Each side 18, 19 of base member 16 has a respective cut-out portion 52, 53 (FIGS. 1 and 2). Mounted on side 19 at cut-out portion 53, is an annular bearing housing 56 having a central opening through which extends tube 20. Housing 56 is attached to side 19 by threaded studs 54 and nuts 55. Located between bearing housing 56 and tube 20 is the radial bearing porion 57 of a bearing having a thrust bearing portion 58 extending outwardly from radial bearing portion 57. Fixed around the outside of tube 20 is a retaining sleeve 59 outwardly from which extends a flange 60 sandwiched between a nylon thrust bearing 61 and thrust bearing portion 58. Nylon thrust bearing 61 in turn is sandwiched between flange 60 and base member side 19, adjacent cut-out portion 53 thereof.

Located on base member side 18, adjacent cut-out portion 52 thereof, is an annular bearing housing 66 secured to side 18 by threaded studs and nuts 64, 65 respectively. Tube 20 extends through the central opening in annular bearing housing 66. Located between bearing housing 66 and tube 20 is a radial bearing 67 having an outwardly extending flange 68 captivated between bearing housing 66 and side 18 of base member 16. Bearings 57, 58 and 67, 68 mount tube 20 for rotation about its axis relative to base 16.

The structure mounting chassis 31 for rotation about the axis of tube 20 includes a peripheral radial flange 69 on bearing housing 66 for retaining a coaxial flange 70 on chassis extension 33. When chassis 31 rotates about the axis of tube 20, coaxial flange 70 slides circumferentially along the outside surface of bearing housing 66.

That end of torsion bar 21 adjacent radial adjusting arm 26 is journalled within a bearing 71 located inside tube 20 adjacent arm 26 (FIG. 4).

FIGS. 2, 3 and 8 illustrate structure for mounting screw 30 on chassis 31 for rotation of screw 30 while holding screw 30 against axial movement relative to chassis 31. Chassis 31 includes a bottom plate 74 and a top plate 75. Screw 30 extends downwardly through chassis bottom plate 74 and terminates at a head 76 which engages against the lower surface of bottom plate 74. At the upper end of screw 30 is a neck portion 78 which extends upwardly through top plate 75 on chassis 31 and engages within a collar 79 integral with handle 32. Collar 79 engages against the upper surface of chassis top plate 75. Head 76 and collar 79 prevent screw 30 from moving axially relative to chassis 31 but permit screw 30 to rotate about its axis in response to turning of handle 32.

Figure 7:
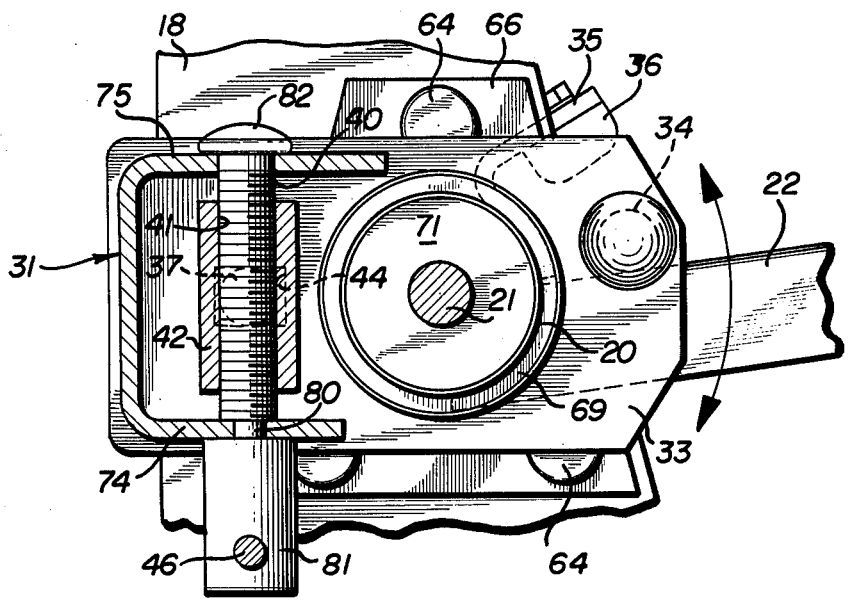
FIG. 7 is a sectional view taken along line 7—7 in FIG. 3.

Structure for rotatably mounting externally threaded member 40 on chassis 31 while holding member 40 against axial movement relative to chassis 31 is illustrated in FIGS. 2, 3 and 7. Located at the bottom of threaded member 40 is a neck portion 80 which extends downwardly through chassis bottom plate 74 and engages a collar 81 through which extends handle 46. Collar 81 engages against the lower surface of chassis bottom plate 74. The top of threaded member 40 extends upwardly through chassis top plate 75 and terminates at a head 82 which engages against the upper surface of top plate 75. Collar 81 and head 82 prevent axial movement of threaded member 40 relative to chassis 41 but permit member 40 to rotate about its axis in response to turning of handle 46.

The foregoing detailed description has been given for clearness of understanding only, and no unnecessary limitations should be understood therefrom, as modifications will be obvious to those skilled in the art.

What is claimed is:

1. In a seat suspension:
   a first member;
   a horizontally disposed second member;
   means mounting said second member on said first member for pivotal movement of said second member about a horizontal axis;
   an elongated link member;
   means attaching one end of said link member to said second member with said link member extending from said second member in a direction transverse to the pivotal axis of said second member;
   said attaching means comprising means mounting said link member for pivotal movement with said second member to change the angular elevation of said link member;
   an elongated torsion bar extending coaxially with said second member;
   means fixing one end of said torsion bar to said second member;
   an arm secured to said torsion bar for rotation therewith, said arm extending radially from the torsion bar at a location thereon remote from said one end of the torsion bar;
   means for pre-loading said torsion bar, said pre-loading means comprising first adjustable means for exerting against said arm a force tending to rotate said arm about the axis of said torsion bar;
   height-adjusting means comprising means for pivoting said pre-loading means, together with said second member and said torsion bar, about the mutual axis of said second member and torsion bar, without changing the pre-load on said torsion bar;

a chassis;

means on said chassis for carrying said pre-loading means;

means on said chassis for carrying at least part of said height-adjusting means;

said height-adjusting means comprising means mounting said chassis on said first member for pivotal movement of the chassis about the axis of said torsion bar;

and first stop means on said chassis, unconnected to said link member and independent of any shock absorbing structures in said seat suspension, for limiting upward pivotal movement of said link member.

2. In a seat suspension as recited in claim 1 wherein:

said height-adjusting means comprises manually actuable means for causing said chassis to undergo said pivotal movement.

3. In a seat suspension as recited in claim 1 wherein said height-adjusting means comprises:

an elongated, externally threaded member;

means mounting said externally threaded member on said chassis for rotation of the threaded member, said mounting means for the threaded member comprising means holding said threaded member against longitudinal movement relative to said chassis;

an internally threaded element mounted on said externally threaded member to provide for axial displacement of one relative to the other in response to rotation of the externally threaded member;

and means mounting said internally threaded element on said first member (1) for pivotal movement of the internally threaded member about a second axis parallel to but displaced from the axis of said torsion bar and (2) for lateral movement in a direction transverse to said second axis.

4. In a seat suspension as recited in claim 3 wherein said last recited mounting means comprises:

a stud fixed to and extending from said first member toward said chassis and terminating at a free end portion;

and means on said internally threaded element for receiving said free end portion of said stud;

said receiving means having a rectangular cross-section transverse to the axis of said stud with one dimension of said rectangular cross-section corresponding essentially to the diameter of said stud to provide for said pivotal movement of the internally threaded element about the axis of said stud, and the other dimension of said rectangular cross-section being substantially greater than the diameter of said stud to provide for said lateral movement of the internally threaded element relative to the axis of said stud.

5. In a seat suspension as recited in claim 1 wherein:

said height-adjusting means includes means mounting that part of said height-adjusting means carried on said chassis for pivotal movement, relative to said first member, about a second axis parallel to but displaced from the axis of said torsion bar.

6. In a seat suspension as recited in claim 1 and comprising:

second stop means, connected to said link member, for engaging said first stop means to limit downward pivotal movement of the link member.

7. In a seat suspension as recited in claim 1 wherein:

said first stop means extends from said chassis across the pivotal path of said link member;

said first stop means comprising means for engaging the link member to limit the link member's upward pivotal movement.

* * * * *